United States Patent Office 3,031,021
Patented Apr. 24, 1962

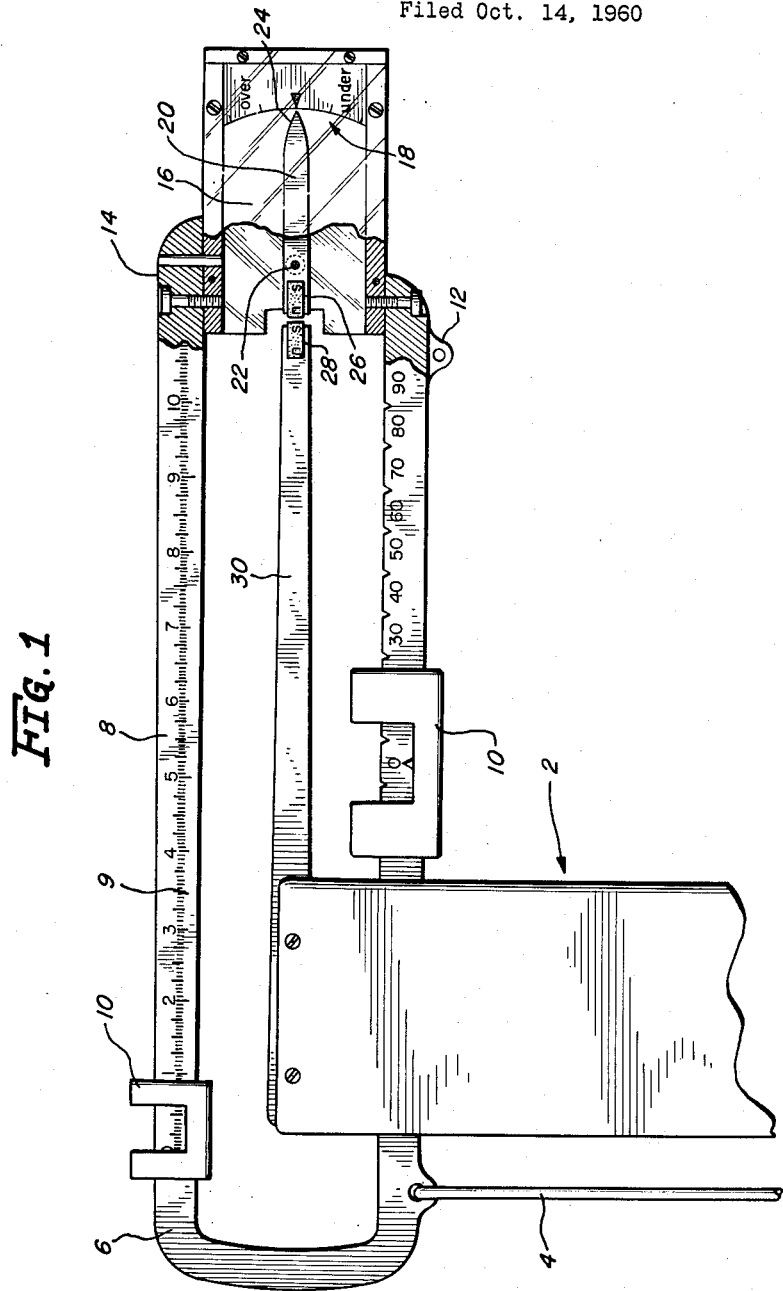

3,031,021
MAGNETIC BALANCE INDICATOR
John D. Hale and John B. Rolfe, St. Johnsbury, Vt., assignors to Fairbanks, Morse & Co., Chicago, Ill., a corporation of Illinois
Filed Oct. 14, 1960, Ser. No. 62,788
1 Claim. (Cl. 177—173)

This invention relates to scales and is particularly directed to novel balance indicating means for use on beam balance scales.

In performing weighing operations with beam balance scales, it is often difficult to determine when an accurate balance has been obtained. To overcome this, it has been suggested heretofore to provide the scale with a balance indicator which would accentuate displacement of the beam from the balance position. Numerous types of devices have been suggested to accomplish this. However, none of the prior art balance indicators have been entirely satisfactory. Many of the prior art devices have employed mechanical motion coupling means between the balance indicator and the beam of the scale. However, these frequently cause a drag on the beam which tends to make the scale readings inaccurate. Others have suggested electronic or optical means for indicating balance. Unfortunately, balance indicators of these types are extremely fragile and may be rendered useless by rough handling, such as may occur in factories or workshops.

These disadvantages of prior art balance indicators are overcome with the present invention and a novel balance indicator is provided which is simple and economical to produce, is extremely light in weight and which is extremely sensitive and accurate.

The advantages of the present invention are preferably attained by providing a sheet of material mounted on the unsupported end of a scale beam and having balance indicating indicia carried thereon, an indicator arm having one end formed to cooperate with said indicia to indicate balance and having a first permanent magnet mounted adjacent the opposite end thereof, means adjacent said opposite end pivotally securing said indicator arm to said sheet of material, and a second permanent magnet mounted on the frame of said scale and positioned in magnetically attractive relation to said first magnet.

Accordingly, it is an object of the present invention to provide a novel balance indicator.

Another object of the present invention is to provide a novel balance indicator which is simple and economical to produce and yet which will not adversely affect the weighing operation.

A further object of the present invention is to provide a novel balance indicator which is mechanically rugged and yet is sensitive and accurate.

A specific object of the present invention is to provide a novel balance indicator comprising a sheet of material mounted on the unsupported end of a scale beam and having balance indicating indicia carried thereon, an indicator arm having one end formed to cooperate with said indicia to indicate balance and having a first permanent magnet mounted adjacent the opposite end thereof, means adjacent said opposite end pivotally securing said indicator arm to said sheet of material, and a second permanent magnet mounted on the frame of said scale and positioned in magnetically attractive relation to said first magnet.

These and other objects and features of the present invention will be apparent from the following detailed description taken with reference to the figure of the accompanying drawing.

In the drawing:

FIG. 1 is a front view of a typical balance indicator embodying the present invention mounted on a beam type scale.

In that form of the present invention chosen for purposes of illustration in the drawing, FIG. 1 shows a conventional beam type scale, indicated generally at 2, having a weigh platform, not shown, which is connected by means of a steelyard rod 4 to the pivoted end 6 of a balance beam 8. If desired, the beam 8 may be graduated, as shown at 9, and one or more poises 10 may be slidably mounted on beam 8 to permit balancing of the scale. In the alternative, balance may be obtained by hanging appropriate drop weights, not shown, to the hanger 12, as is well known in the art.

Adjacent the end 14 of the beam 8 remote from the pivoted end 6, a sheet 16 of material is mounted on which are displayed suitable balance indicating indicia 18. An indicator arm 20 is provided and is pivotally connected, as by pivot pin 22, to the sheet 16. The opposite end 24 of indicator arm 20 is formed to cooperate with the indicia 18 to indicate balance. In addition, a permanent magnet 26 is mounted on the pivoted end of the indicator arm 20 and a second magnet 28 is supported on the frame of the scale 2 by suitable means, such as rod 30, and is positioned in magnetically attractive relation to the magnet 26 carried by the indicator arm 20.

Due to the attracting forces following between magnets 26 and 28, any slight displacement of the beam 8 from a balanced position will cause the indicator arm to pivot about pin 22. Moreover, since pivot pin 22 is located closely adjacent one end of the indicator arm 20, the displacement of beam 8 will be represented by a greatly amplified movement of end 24 of indicator arm 20. Thus, even slight unbalance of the beam 8 will be readily apparent and the sensitivity of the scale will be greatly enhanced. Moreover, it will be readily apparent that the sheet 16 and indicator arm 20 may readily be formed of light weight, inexpensive material, such as sheet metal or plastic, and need almost no working. Thus, the balance indicator of the present invention is extremely inexpensive to produce. Furthermore, if desired, either one of the magnets 26 or 28 may be replaced by an unmagnetized piece of ferromagnetic material, such as soft iron, without adversely affecting the operation of the balance indicator.

In addition, numerous other variations and modifications may obviously be made without departing from the invention. Accordingly, it should be clearly understood that the form of the invention described above and shown in the figure of the accompanying drawing is illustrative only and is not intended to limit the scope of the invention.

What is claimed is:

A balance indicator for use with a beam type scale, said balance indicator comprising a sheet of material mounted on the unsupported end of the beam of said scale and having balance indicating indicia carried thereon, an indicator arm having one end formed to cooperate with said indicia to indicate balance, a first permanent magnet on said indicator arm mounted adjacent the opposite end of said indicator arm, means adjacent said opposite end of said indicator arm pivotally securing said indicator arm to said sheet of material, and a second permanent magnet mounted on the frame of said scale and positioned in magnetically attractive relation to said first magnet.

References Cited in the file of this patent

UNITED STATES PATENTS

| 1,974,940 | Wood | Sept. 25, 1934 |
| 2,475,684 | Weckerly | July 12, 1949 |
| 2,659,593 | Singleton | Nov. 17, 1953 |